United States Patent [19]

Schomer

[11] 3,995,500
[45] Dec. 7, 1976

[54] LOGARITHMIC STATISTICAL DISTRIBUTION ANALYZER

[75] Inventor: Paul D. Schomer, Champaign, Ill.

[73] Assignee: The United States of America as represented by the Secretary of the Army, Washington, D.C.

[22] Filed: Dec. 4, 1975

[21] Appl. No.: 637,793

[52] U.S. Cl. .................................................. 73/552
[51] Int. Cl.² .......................................... G01H 3/14
[58] Field of Search ............ 73/552, 555, 556, 557, 73/558, 559; 179/1 N; 340/347 AD; 235/151.31; 324/77 F

[56] References Cited
UNITED STATES PATENTS

| 3,483,941 | 12/1969 | Brady | 73/557 |
| 3,613,111 | 10/1971 | Paine | 340/347 AD |
| 3,892,133 | 7/1975 | Quinn | 73/556 |

Primary Examiner—Donald O. Woodiel
Assistant Examiner—Stephen A. Kreitman
Attorney, Agent, or Firm—William G. Gapcynski; Frank R. Agovino; Lawrence A. Neureither

[57] ABSTRACT

A device for measuring the statistical distribution within a discrete range of a measured continuous variable. A conventional type meter which employs a scaling amplifier in series with weighted filters, a true RMS detector and time averager is used to detect the variable level and convert it to a analogue voltage of magnitude proportional to the magnitude of the variable at any given instant. The voltage signal is then passed through a scaling amplifier to an analogue to digital converter. The converter is controlled by a timer with an adjustable rate in such a way that the converter output is pulsed. Each level of the digital output is connected to a counter. Since each level corresponds to a discrete range of magnitudes of the variable, the percent time within a given discrete range can be calculated from the ratio of the pulses counted at a given level to the total number of samples taken.

7 Claims, 4 Drawing Figures

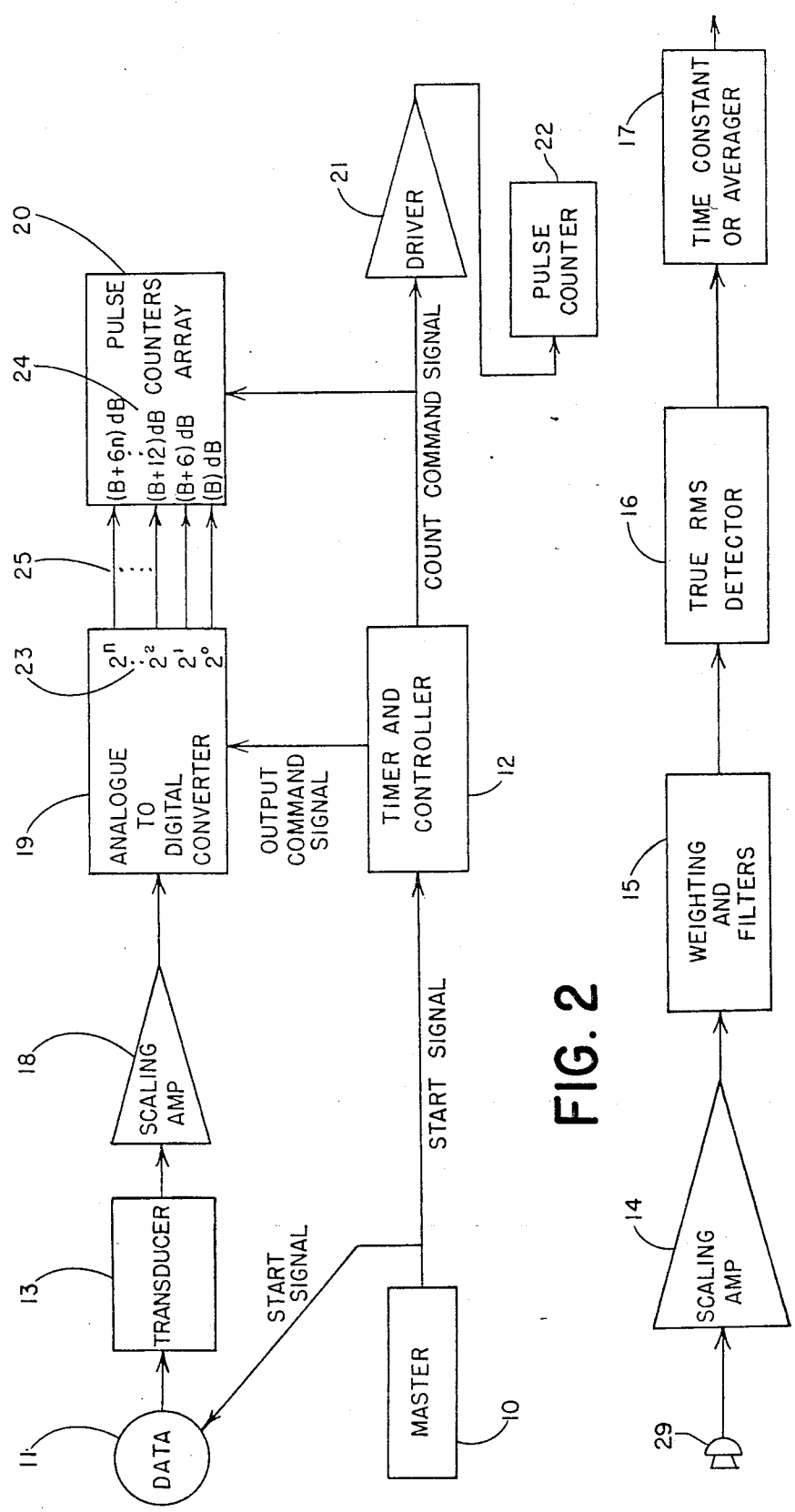

LOGARITHMIC STATISTICAL DISTRIBUTION ANALYZER

The invention described herein may be manufactured and used by or for the Government for goverenmental purposes without the payment of royalties thereon.

BACKGROUND OF THE INVENTION

1. The Field of the Invention

The present invention generally relates to statistical disbribution analysers and, more particularly, to analysers which measure the distributions of discrete levels of signals on a logarithmic scale, such as decibels.

2. Description of the Prior Art

Many times in the study of continuous variables, it is desired to know the statistical distribution of the measured variable. For example, in acoustics one desires to know the precent time that the sound pressure level is above various levels. In engineering problems where the unit of measure of the variable is in a logarithmic scale, such as decibels, classical statistical distribution analysers employ some form of a logarithmic amplifier followed by some form of analog to digital conversion. However, these types of circuits are expensive due to the high cost of logarithmic amplifiers and are only as accurate as the amplifier.

A standard type of analog to digital converter, such as the one disclosed by U.S. Pat. No. 3,613,111, converts incoming analog voltages to binary notation. The digital output line for any one voltage consists of an output at every level which is equal to or below the highest level of binary notation. Actually, each output line is actually the "OR"ing of the digital output with all of the other output lines which are more significant.

By definition, the decibel is one-tenth of the logarithm of the ratio of the measured sound power and a reference sound power, or $$n = 10 \log (W/W_o) \quad (1)$$

where
  $n$ = decibels
  $W$ = sound power (watts)
  $W_o$ = reference sound power (watts)

When the conditions are such that scalar ratios of currents or voltages (or analogous quantities in other fields such as pressures, amplitudes, or particle velocities in sound) are the square roots of the corresponding power ratios, the nmber of decibels by which the corresponding power ratios differ is expressed by the following formulae:

$$n = 20 \log (V_1/V_2) \quad (2)$$

$$n = 20 \log (I_1/I_2) \quad (3)$$

where $I_1/I_2$ and $V_1/V_2$ are the given current and voltage ratios, respectively.

SUMMARY OF THE INVENTION

The invention comprises an analog to digital converter controlled by an adjustable timer in such a way that the output of the converter is pulsed. The output of each level of the converter is connected to a pulse counter. The timer simultaneously sends an output command signal to the converter and a count command signal to the counters. The logarithmic statistical distribution at any one level can be found by dividing the number of pulses at that level by the total number of count command signals.

It is the primary object of this invention to provide a less expensive logarithmic statistical distribution analyser than the standard off the shelf version.

It is also the object of this invention to take advantage of the fact that analog to digital converters, by their very nature, have output lines which correspond to powers of two.

It is a further object of this invention to eliminate the dependence of the accuracy of logarithmic statistical distribution analysers on the logarithmic amplifier used by eliminating the use of the logarithmic amplifier.

BRIEF DESCRIPTION OF THE DRAWINGS

Other objects and features of this invention will become apparent to those skilled in the art by referring to the preferred embodiment described on the following specification and shown in the accompanying drawings in which:

FIG. 1 is a block diagram illustrating the basic design of the logarithmic statistical distribution analyser;

FIG. 2 is a block diagram illustrating the basic design of the conventional type microphone and meter employed in the logarithmic statistical distribution analyser;

DESCRIPTION OF THE PREFERRED EMBODIMENT

Figure 3:
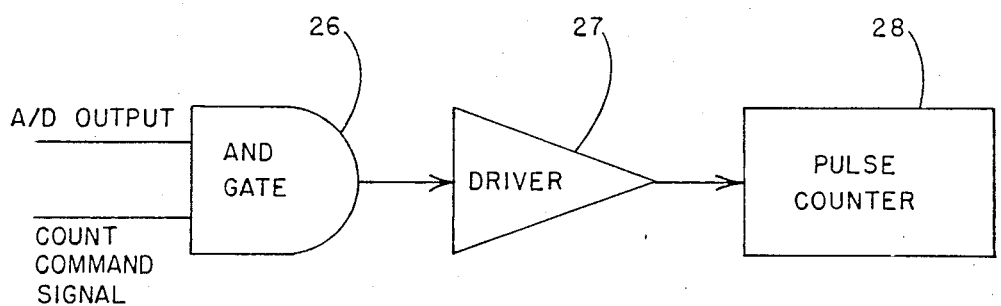
FIG. 3 is a block diagram illustrating the pulse counter circuit.
Figure 4:
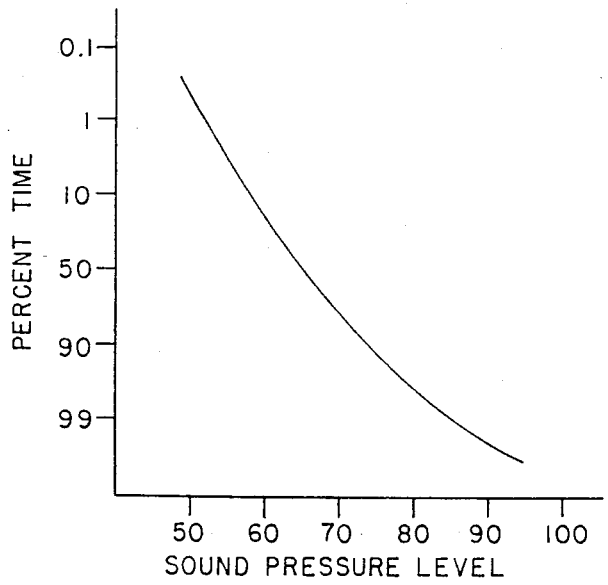
FIG. 4 is a typical statistical distribution curve of sound pressure level.

Referring to the drawings, the logarithmic statistical distribution analyser as illustrated in block form in FIG. 1 is controlled by master unit 10 which activates the data souce 11 and the timing and controller circuit 12 by sending a start signal to the inputs of the data source 11 and the timer and controller 12. The output of the data source is directed toward the input of the meter 13 and the magnitude of the data source 11 is thereby measured.

The transducer 13, as illustrated by FIG. 2, is of the conventional type and its input consists of a conventional transducer for use with the specific medium being measured such as, for example, a microphone 29 when the medium is sound. The output of the transducer is fed through scaling amplifier 14 and the output of the scaling amplifier 14 is weighted and filtered as symbolized by reference character 15. The resulting output is directed through a true RMS detector 16 in series with a time constant or averager 17. This derivative output which is the output of the conventional meter 13, is fed through a scaling amplifier 18. The output of the scaling amplifier 18 is connected to the input of a standard analogue to digital converter (A/D converter) 19.

The timer and controller 12 is a conventional type of circuit which has an input and two outputs. Upon receipt by the input of a start signal from the master 10 the outputs begin periodic transmission of signals. One output is connected to the A/D converter 19 and the other output is connected to the pulse counter array 20 and the driver 21 of the total pulse counter 22. The A/C converter interprets the output signal of the timer and controller 12 as an "output command signal" and releases an output pulse to the pulse counter array 20.

The driver 21 and the pulse counter array 20 interpret the output signal of the timer and controller 12 as a "count command signal". The driver 21 and the total time pulse counter 22 are conventional. Upon receipt of a signal, the driver 21 sends a corresponding signal to the total time pulse counter 22 which is added to the prior total of corresponding signals that the total time pulse counter 22 has received from the driver 21. Therefore, the total number of signals on the total time pulse counter 22 is the total number of samples that the timer and controller 12 has extracted from the A/C converter 19.

The A/D converter output levels, generally referred to by reference character 23, each correspond to a power of two. Therefore, each successively higher A/D output line indicates a six decibel higher input signal level. For example, if decibels were represented by voltages expressed in powers of two, equation (1) would be as follows:

$$n(x) = 20 \log 2^x, \text{ or} \qquad (4)$$

$$n(x) = (x)(20) \log 2. \qquad (4a)$$

$$\text{Since } \log 2 = 0.3, n(x) = 6x \qquad (5)$$

and between any two levels $$\Delta n = n(x) - n(x-1)$$

$$\Delta n = 6(x) - 6(x-1) = 6$$

Conveniently, this arrangement provides a grouping similar to the preferred speech interference level (PSIL). These levels are referred to by reference characters 23 and 24 where $2^0$ and B are the base level or least significant bit and $2^n$ and $B + 6n$ are the maximum level or most significant bit.

The scaling amplifier 18 is used to adust the level of the signal of the meter 13 such that the minimum signal level just "turns on" the least significant bit or the maximum signal level about which information is desired just turns on the most significant bit. The range over which the signal can be divided into six decibel increment is dependent on the setting of the scaling amplifier 18.

In the standard A/D, more than one output line may be "high" or "true" at one time. Using standard parts and technology, for each sample, all lines below the most significant of the A/D lines set are set true and transmitted to each respective pulse counter 24. Thus, any true line indicates that the signal for that sample was at or above the value represented by that line.

Each level output 25 is connected to the first input of a standard "AND" gate, as illustrated in FIG. 3. The second input of the AND gate is connected to the timer and controller 12 and receives the count command signal. The output of the AND gate 26 is connected to a driver 27 which is connected to a pulse counter 28. In this manner, the reading in each respective pulse counter 28 is proportional to the time that the signal has been greater than or equal to the level corresponding to that respective counter.

The frequency with which samples of data are counted and measured is dependent upon the continuity and range of the data source 11 being measured and upon the averaging time associated with the true RMS detector 16. To find the percent time that the data source 11 reaches a specified level, the reading on the pulse counter 28 which is connected to the level of the A/D converter 23 which corresponds to the specified level is divided by the reading on the total time pulse counter 22 and multiplied by 100%.

Although particular embodiments of the invention have been described and illustrated herein, it is recognized that modifications and variations may readily occur to those skilled in the art and consequently it is intended that the claims be interpreted to cover such modifications and equivalents.

I claim:

1. Apparatus for measuring the logarithmic distribution of a given physical quantity comprising:
   a. transducer means for detecting the level of a physical quantity and coverting said physical quantity into a corresponding analog signal;
   b. converter means connected to said transducer means for changing said analog signal into an equivalent digital signal having discrete output levels corresponding to power of two;
   c. pulsing means connected to said converter means for pulsing said digital signal; and
   d. counting means for receiving said digital signal and counting each discrete output level of said digital signal whereby the time during a finite period that said physical quantity is above a given discrete level can be found from the ratio of the number of pulses at said given discrete level and the total number of pulses during said finite period.

2. The apparatus as described in claim 1 wherein said transducer means comprises a microphone, sound level meter and first scaling amplifier connected in series.

3. The apparatus as described in claim 2 wherein said sound level meter comprises a second scaling amplifier, weighting circuit means, signal filter means, true RMS detector and time averager connected in series.

4. The apparatus as described in claim 1 wherein said pulsing means comprises an AND gate with first and second inputs with said first input connected to said digital signal and said second input connected to a periodic signal pulse.

5. The apparatus as described in claim 1 wherein said counting means comprises a driver and pulse counter connected in series to each said discrete level of said digital signal.

6. The apparatus as described in claim 4 wherein said pulsing means further comprises a control circuit connected to said converter for pulsing the output of said converter in synchronization with the periodic signal pulse.

7. Apparatus for measuring sound distribution levels comprising:
   a. a microphone for monitoring the sound and converting the sound into a corresponding electrical signal;
   b. a sound level meter having a scaling amplifier connected to said microphone for converting said electrical signal into a corresponding analog signal;
   c. an analog to digital converter connected to said sound level meter for converting said analog signal into a corresponding digital signal having discrete output levels corresponding to powers of two;
   d. an AND gate with first and second inputs with said first input connected to said digital signal and said second input connected to a periodic signal pulse;

e. a control circuit connected to said converter for pulsing the output of said converter in synchronization with the periodic signal pulse; and
f. a driver and pulse counter connected in series to each said discrete output level of said digital signal whereby the fraction of time during a finite period that the sound level is above a given discrete level can be found by dividing the number of counts at the given discrete level with the total number of periodic signal pulses during the finite period.

* * * * *